United States Patent
Watanabe et al.

(10) Patent No.: US 10,876,872 B2
(45) Date of Patent: Dec. 29, 2020

(54) PHYSICAL QUANTITY DETECTION DEVICE

(71) Applicant: HITACHI AUTOMOTIVE SYSTEMS, LTD., Ibaraki (JP)

(72) Inventors: Tsubasa Watanabe, Tokyo (JP); Hiroaki Hoshika, Hitachinaka (JP); Takayuki Yogo, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 141 days.

(21) Appl. No.: 16/092,633

(22) PCT Filed: Mar. 24, 2017

(86) PCT No.: PCT/JP2017/012031
§ 371 (c)(1),
(2) Date: Oct. 10, 2018

(87) PCT Pub. No.: WO2017/179397
PCT Pub. Date: Oct. 19, 2017

(65) Prior Publication Data
US 2019/0120675 A1   Apr. 25, 2019

(30) Foreign Application Priority Data

Apr. 11, 2016   (JP) ................... 2016-078570

(51) Int. Cl.
*G01F 1/684* (2006.01)
*G01F 15/14* (2006.01)
*G01M 15/04* (2006.01)

(52) U.S. Cl.
CPC ............. *G01F 1/684* (2013.01); *G01F 15/14* (2013.01); *G01M 15/042* (2013.01)

(58) Field of Classification Search
CPC ....... G01F 1/684; G01F 15/14; G01M 15/042
(Continued)

(56) References Cited

U.S. PATENT DOCUMENTS

| | | | | |
|---|---|---|---|---|
| 6,012,432 A * | 1/2000 | Igarashi | ............... | F02D 41/187 123/494 |
| 6,997,051 B2 * | 2/2006 | Okazaki | ............... | G01F 1/684 73/204.22 |
| 7,255,837 B2 * | 8/2007 | Abe | ............... | G01F 15/006 73/204.22 |

(Continued)

FOREIGN PATENT DOCUMENTS

| DE | 102013221791 A1 | 10/2013 |
|---|---|---|
| JP | 11-132808 A | 5/1999 |

(Continued)

OTHER PUBLICATIONS

International Search Report for PCT/JP2017/012031, dated May 30, 2017.

(Continued)

*Primary Examiner* — Octavia Hollington
(74) *Attorney, Agent, or Firm* — Volpe Koenig

(57) ABSTRACT

A physical quantity detection device includes: a housing; a circuit board; a resin material which covers the circuit board; a cover which forms a circuit chamber in which the circuit board is disposed and a flow path through which a gas to be measured passes together with the housing; and a conductor which is disposed to be exposed to the flow path, in which the conductor and the circuit board are electrically connected to each other.

10 Claims, 18 Drawing Sheets

(58) Field of Classification Search
USPC .................................................. 73/114.34
See application file for complete search history.

(56) References Cited

U.S. PATENT DOCUMENTS

| | | |
|---|---|---|
| 2004/0129073 A1 | 7/2004 | Saito et al. |
| 2012/0055245 A1 | 3/2012 | Doi et al. |
| 2012/0198943 A1* | 8/2012 | Saito .................. G01L 23/24 73/861.42 |
| 2013/0061684 A1 | 3/2013 | Frauenholz et al. |
| 2015/0168193 A1 | 6/2015 | Morino et al. |
| 2015/0177038 A1 | 6/2015 | Tashiro et al. |
| 2015/0177043 A1 | 6/2015 | Tokuyasu et al. |
| 2015/0323360 A1 | 11/2015 | Doi et al. |
| 2015/0330820 A1 | 11/2015 | Sakuma et al. |
| 2015/0338258 A1 | 11/2015 | Kono et al. |
| 2015/0355006 A1 | 12/2015 | Tashiro et al. |

FOREIGN PATENT DOCUMENTS

| | | |
|---|---|---|
| JP | 2003-130701 A | 5/2003 |
| JP | 2012-052975 A | 3/2012 |
| JP | 2013-120103 A | 6/2013 |
| JP | 2014-001954 A | 1/2014 |
| JP | 2014-001973 A | 1/2014 |
| JP | 2014-006210 A | 1/2014 |
| JP | 2014-010024 A | 1/2014 |
| JP | 2014-071032 A | 4/2014 |
| JP | 2014-119330 A | 6/2014 |
| JP | 2014-134519 A | 7/2014 |
| JP | 2015-057615 A | 3/2015 |
| JP | 2016-006438 A | 1/2016 |
| WO | 02/095339 A1 | 11/2002 |
| WO | 2013/187168 A1 | 12/2013 |

OTHER PUBLICATIONS

Japanese Office Action dated May 7, 2019 for the Japanese Patent Application No. 2016-078570.

Japanese Notification of Submission of Publications received on Jan. 31, 2019 for the Japanese Patent Application No. 2016-078570.

* cited by examiner

[FIG. 1]
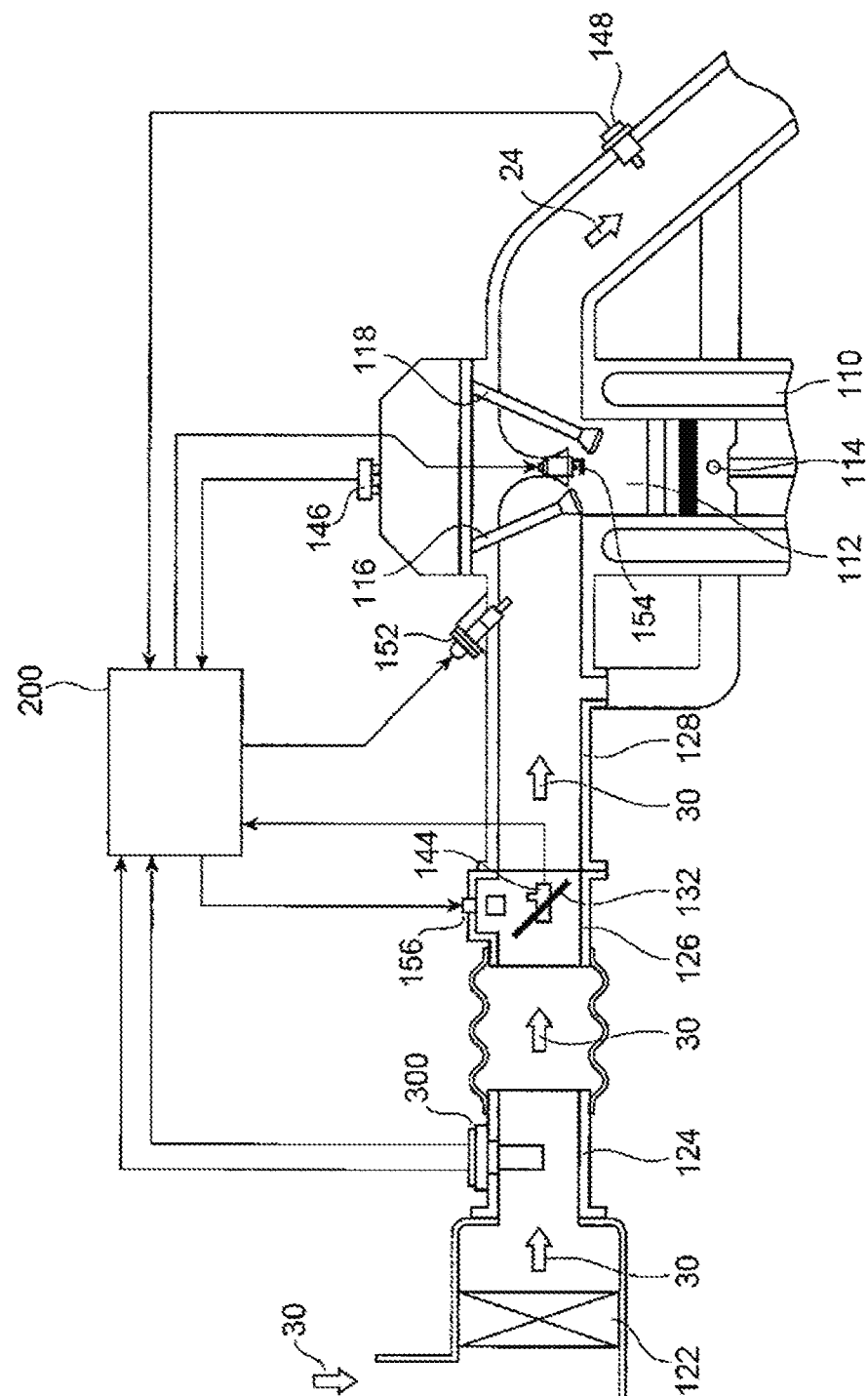

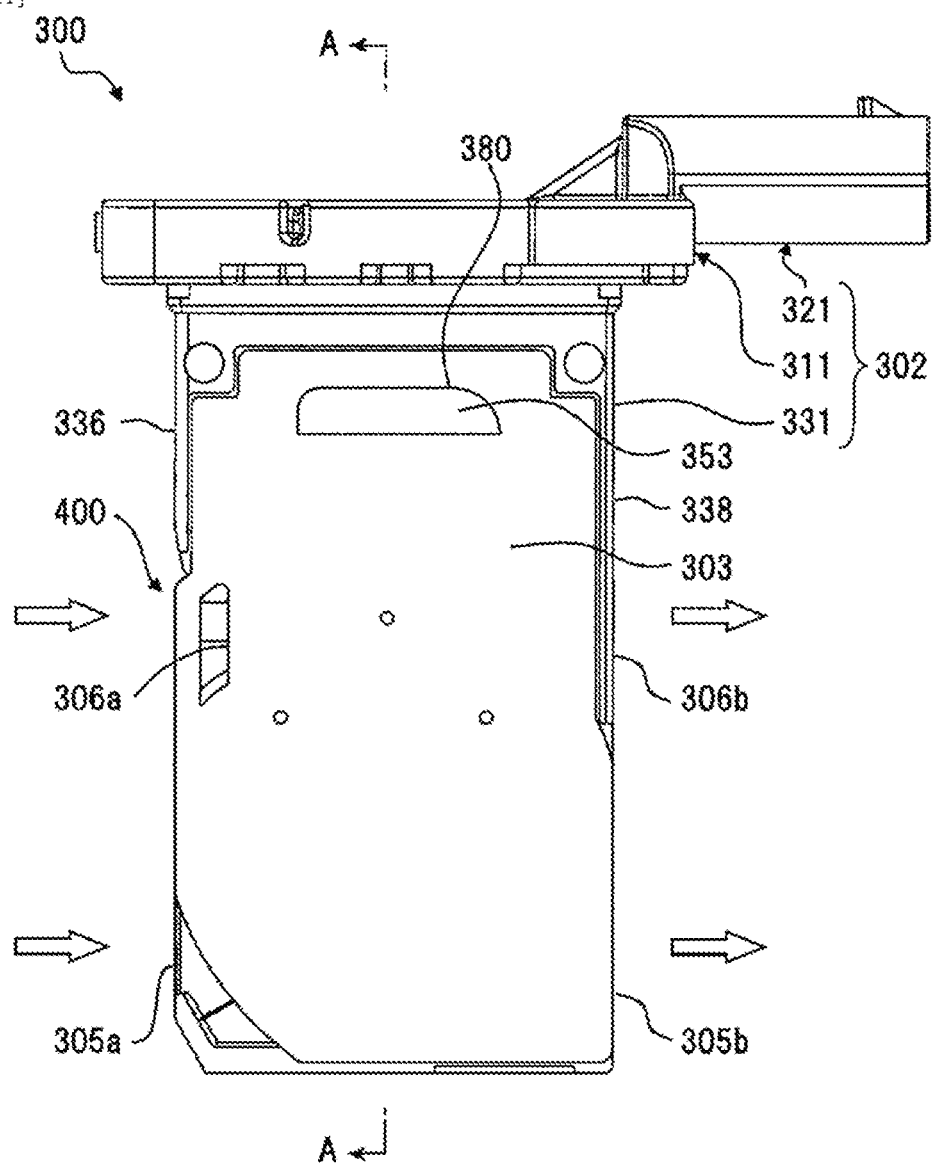
[FIG. 2A]

[FIG. 2B]
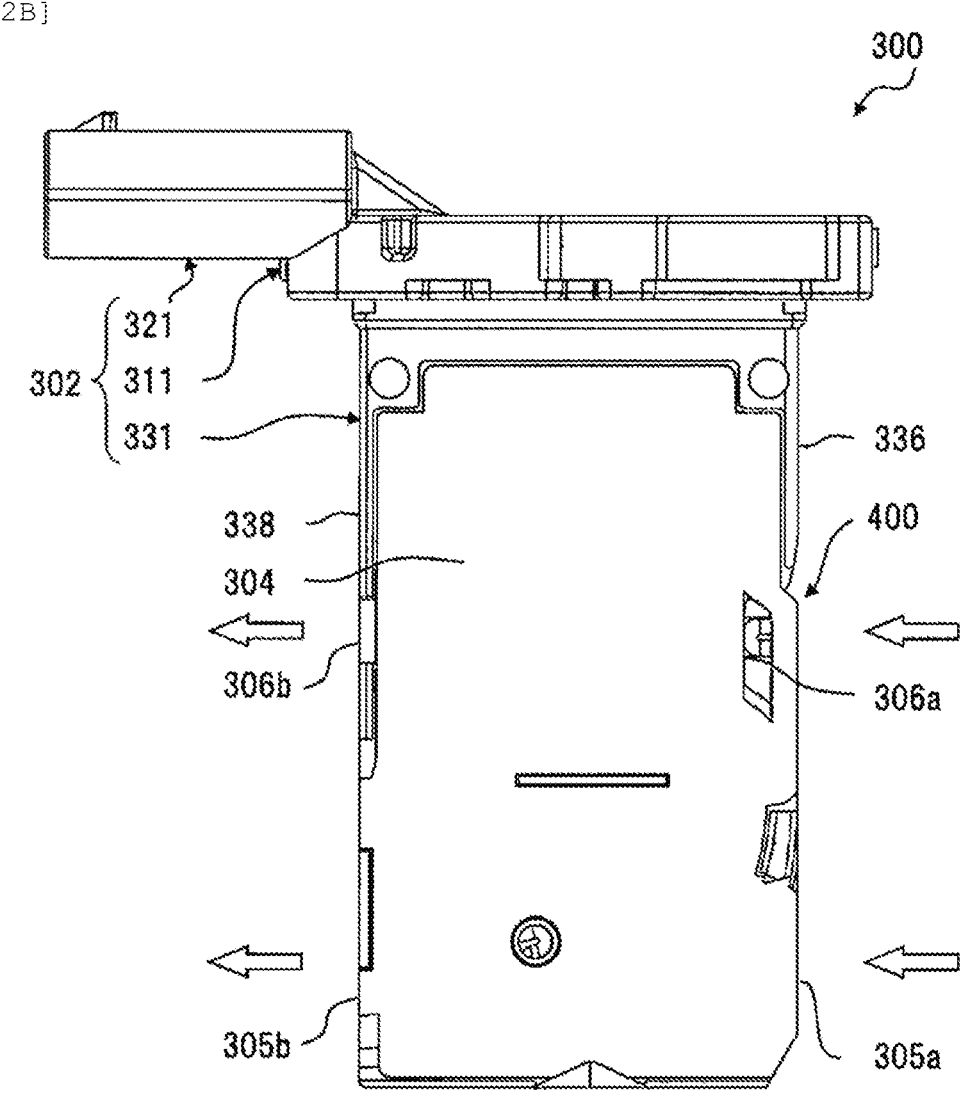

[FIG. 2C]
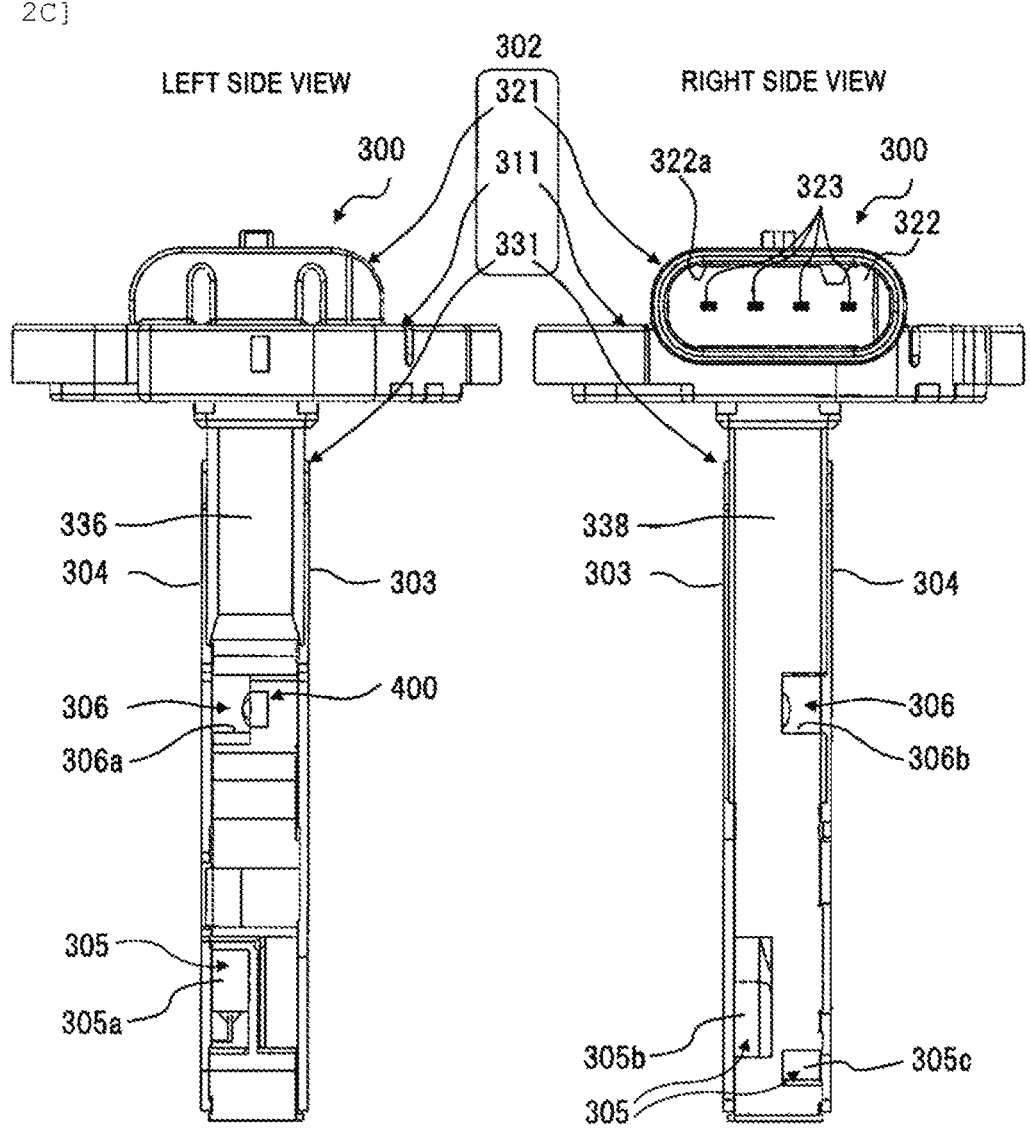

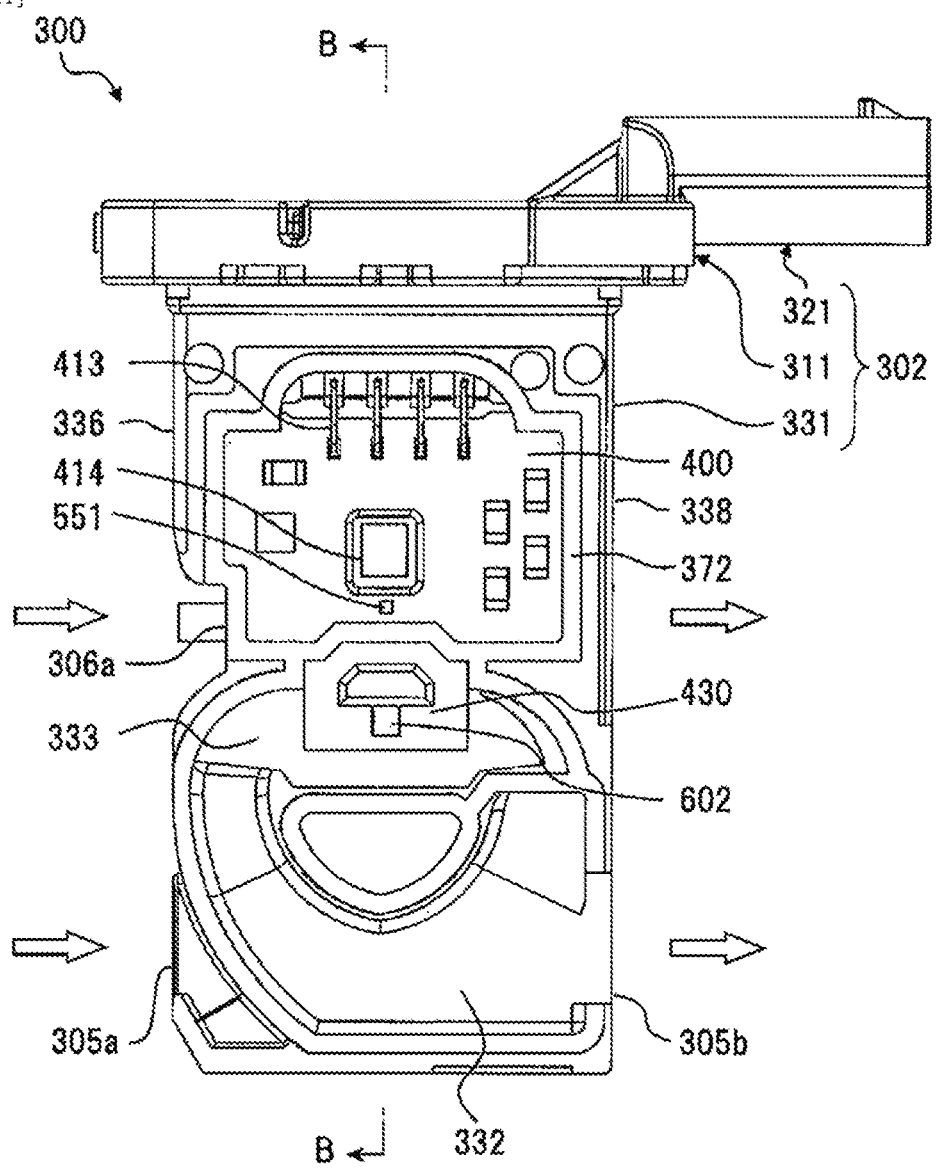

[FIG. 3B]
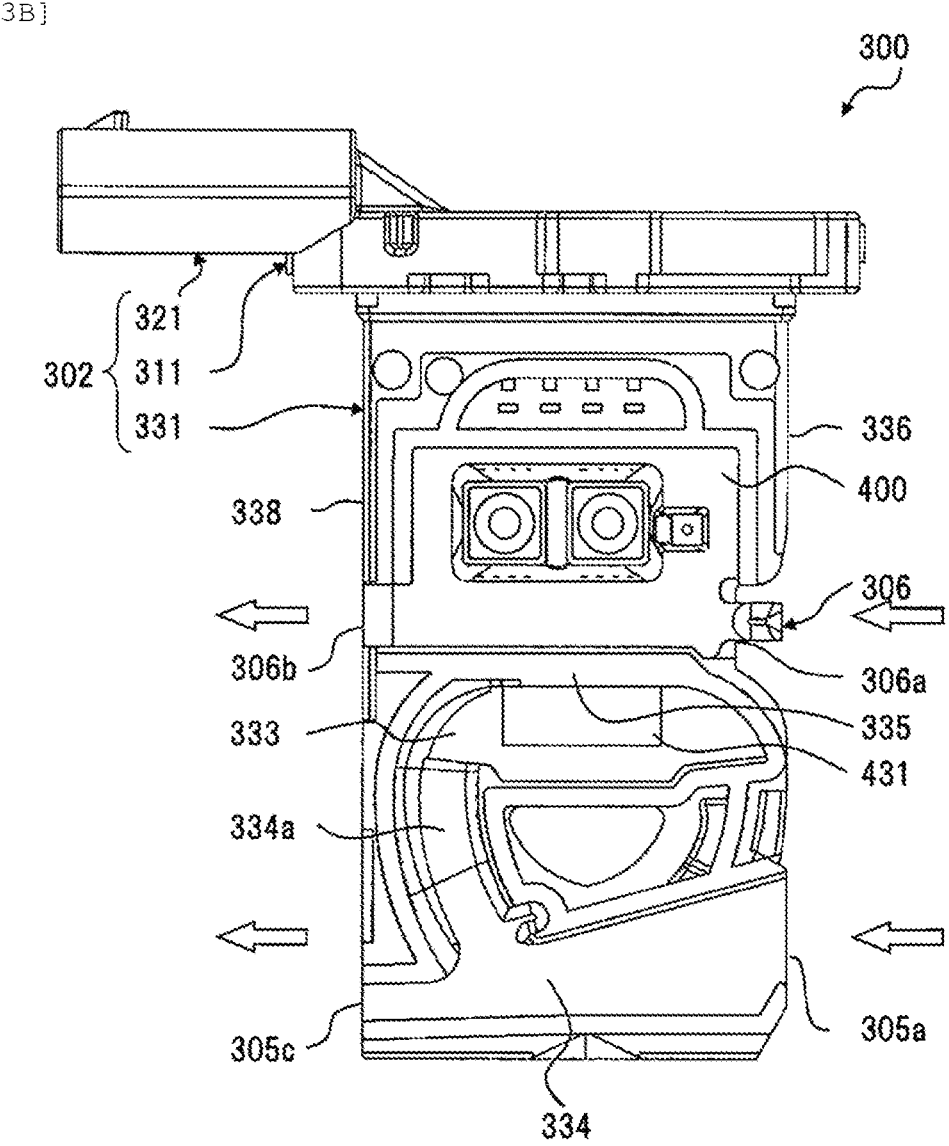

[FIG. 3C]
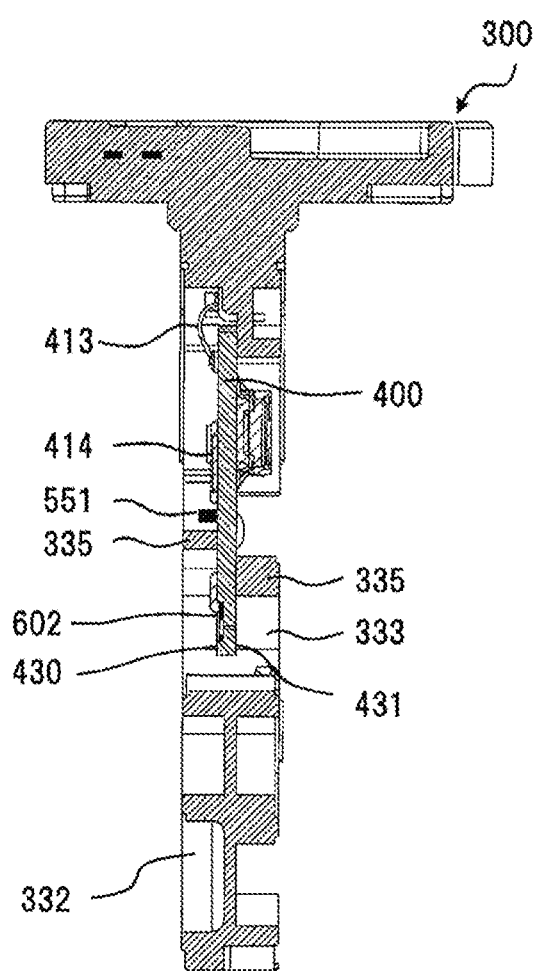

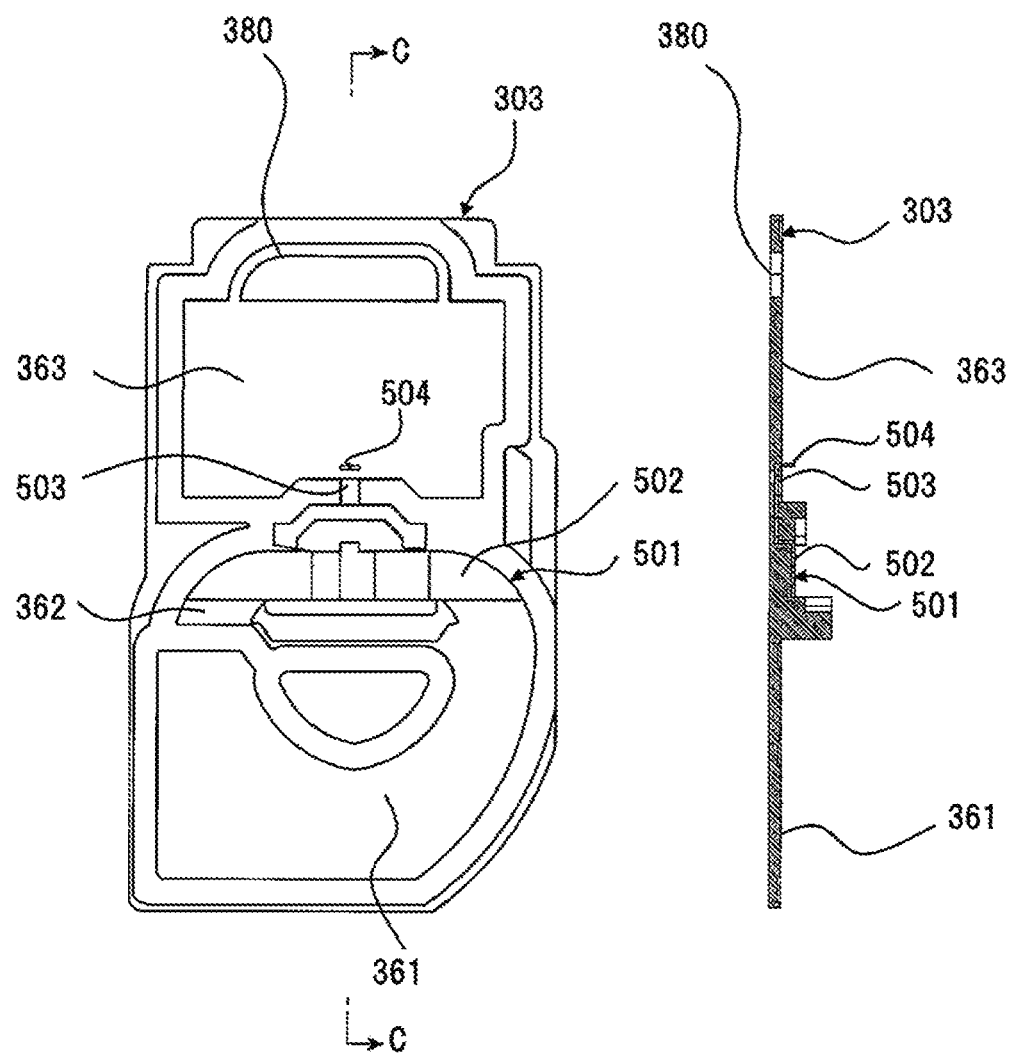
[FIG. 4]

[FIG. 5]
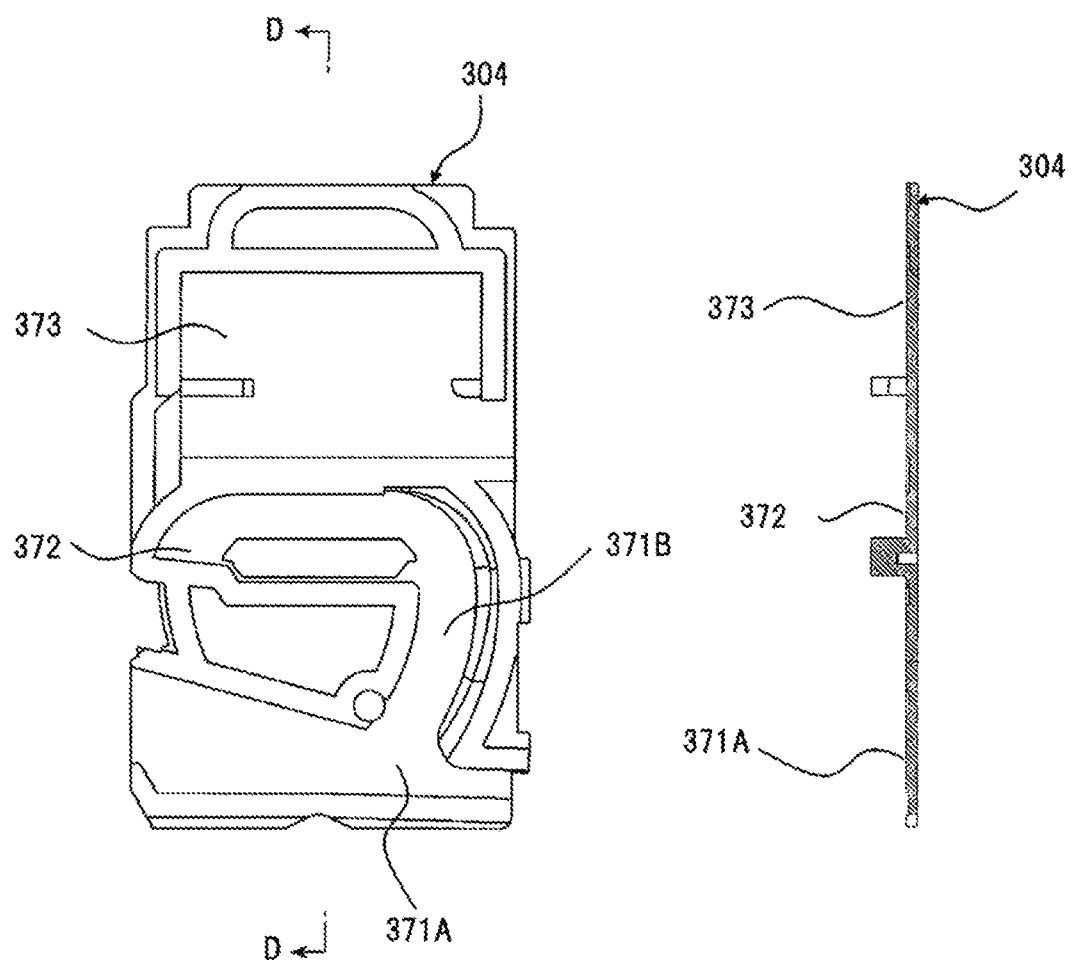

[FIG. 6]
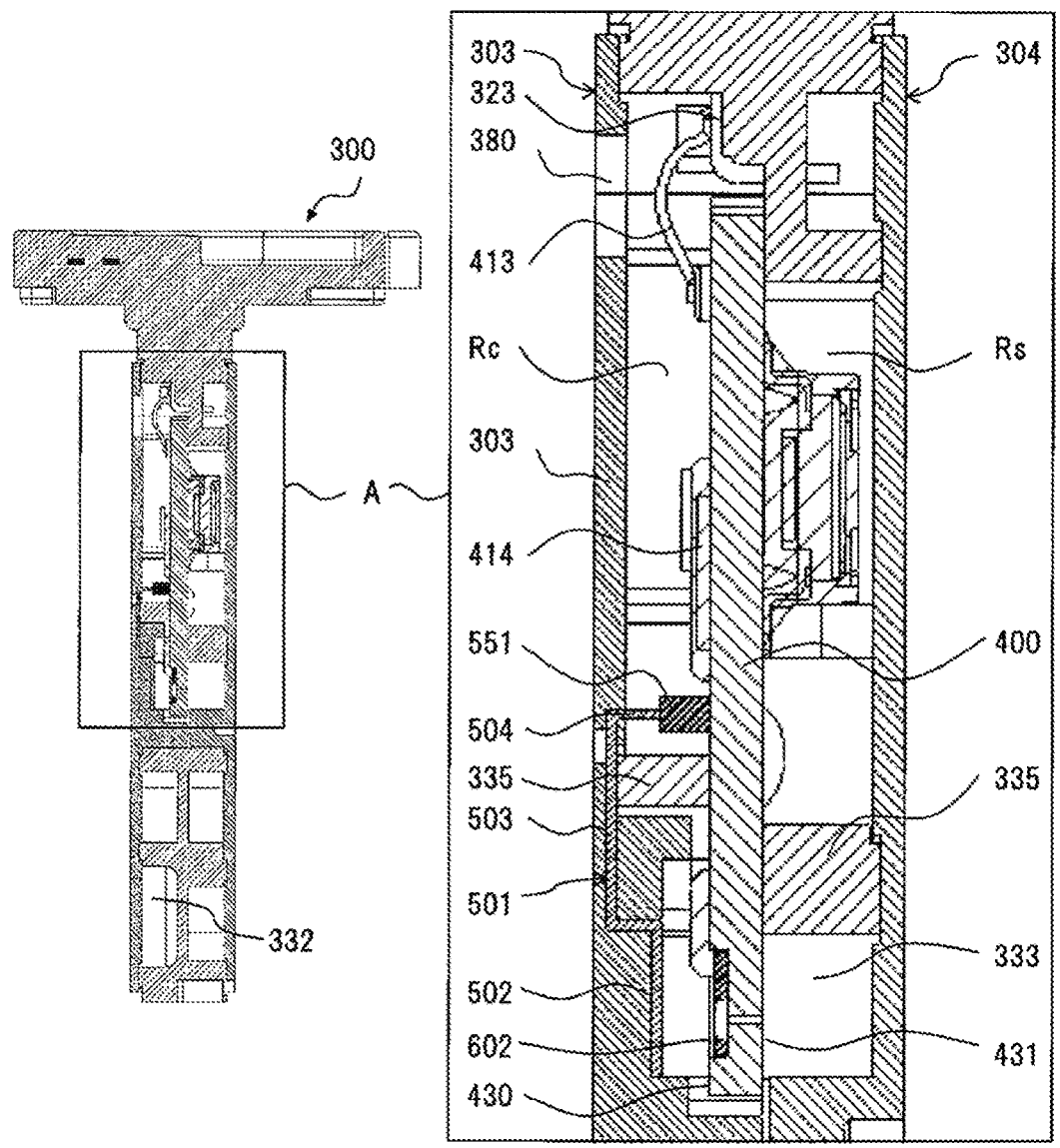

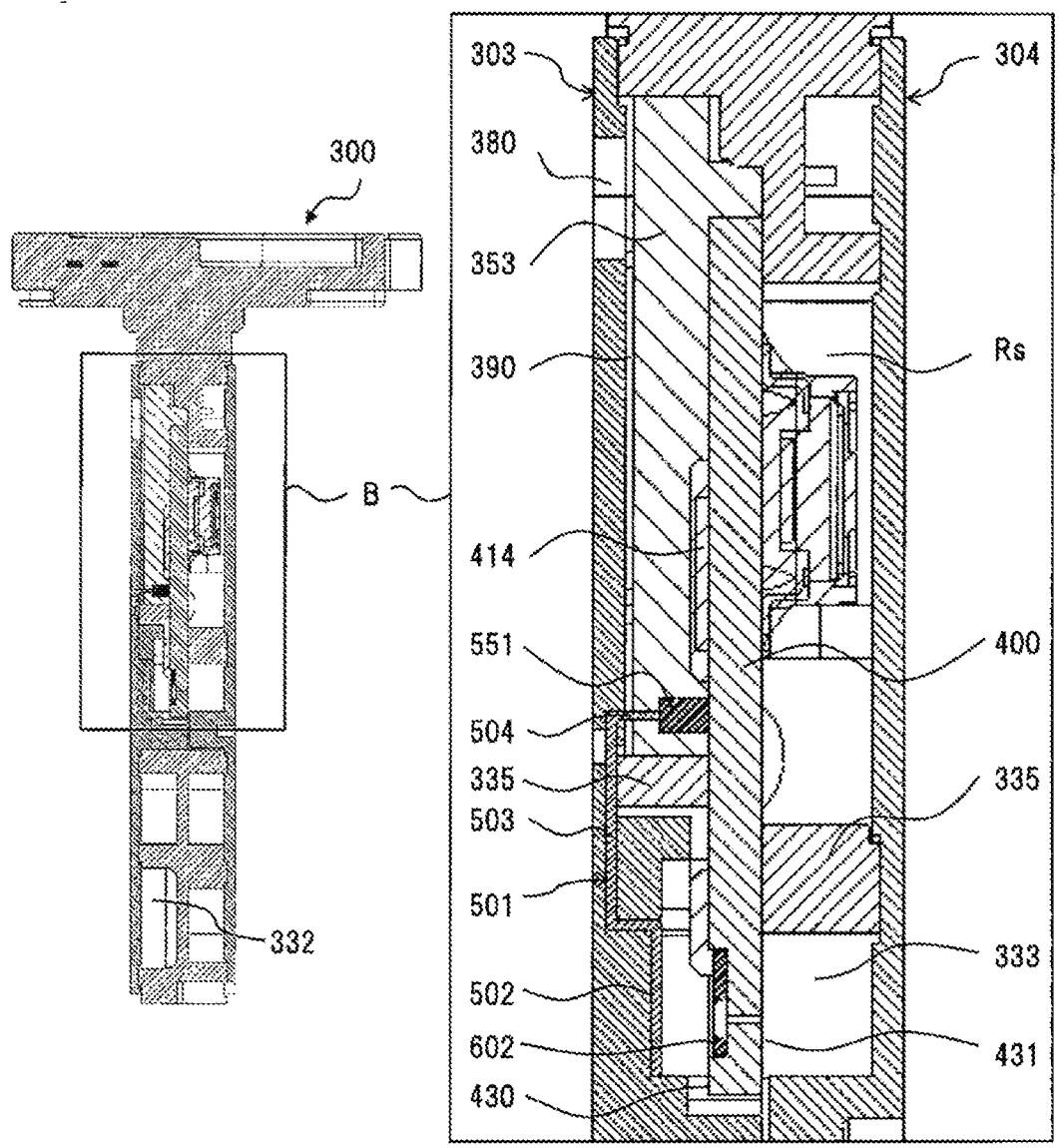
[FIG. 7]

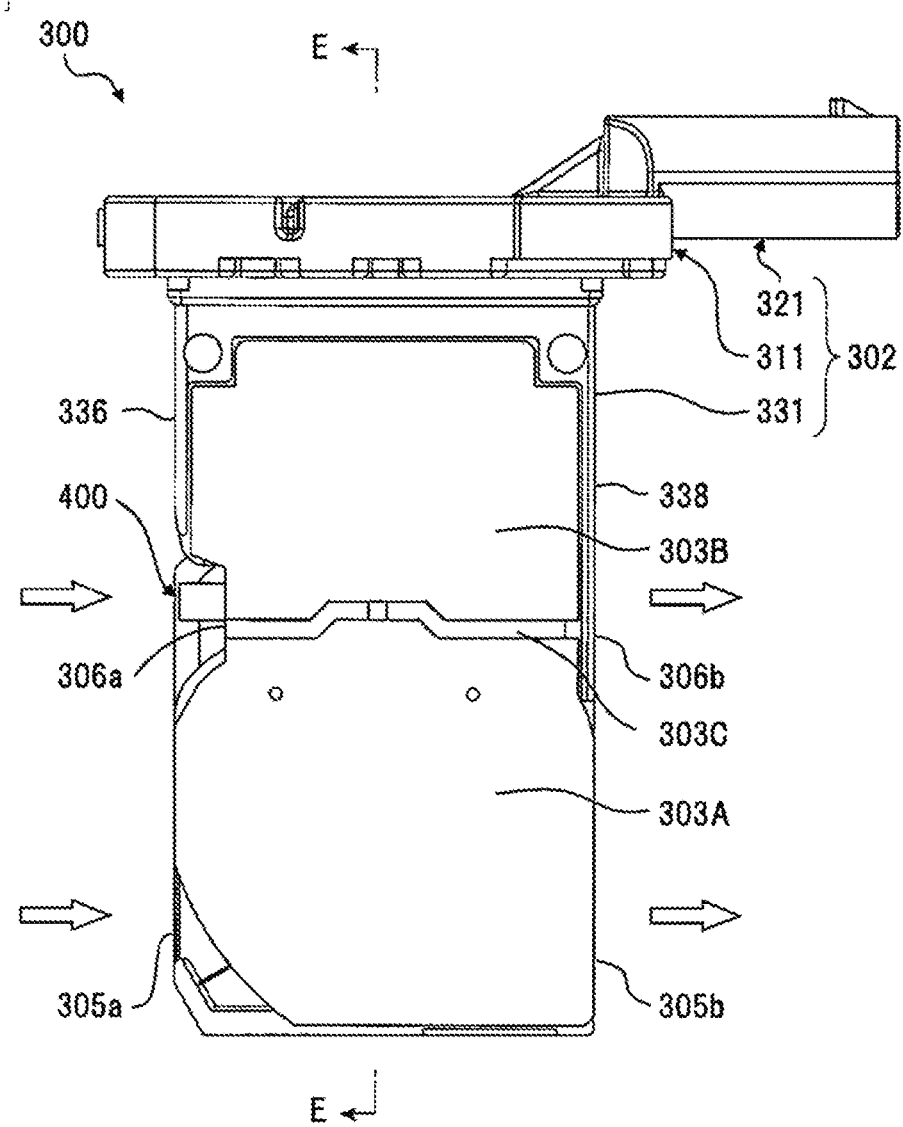
[FIG. 8A]

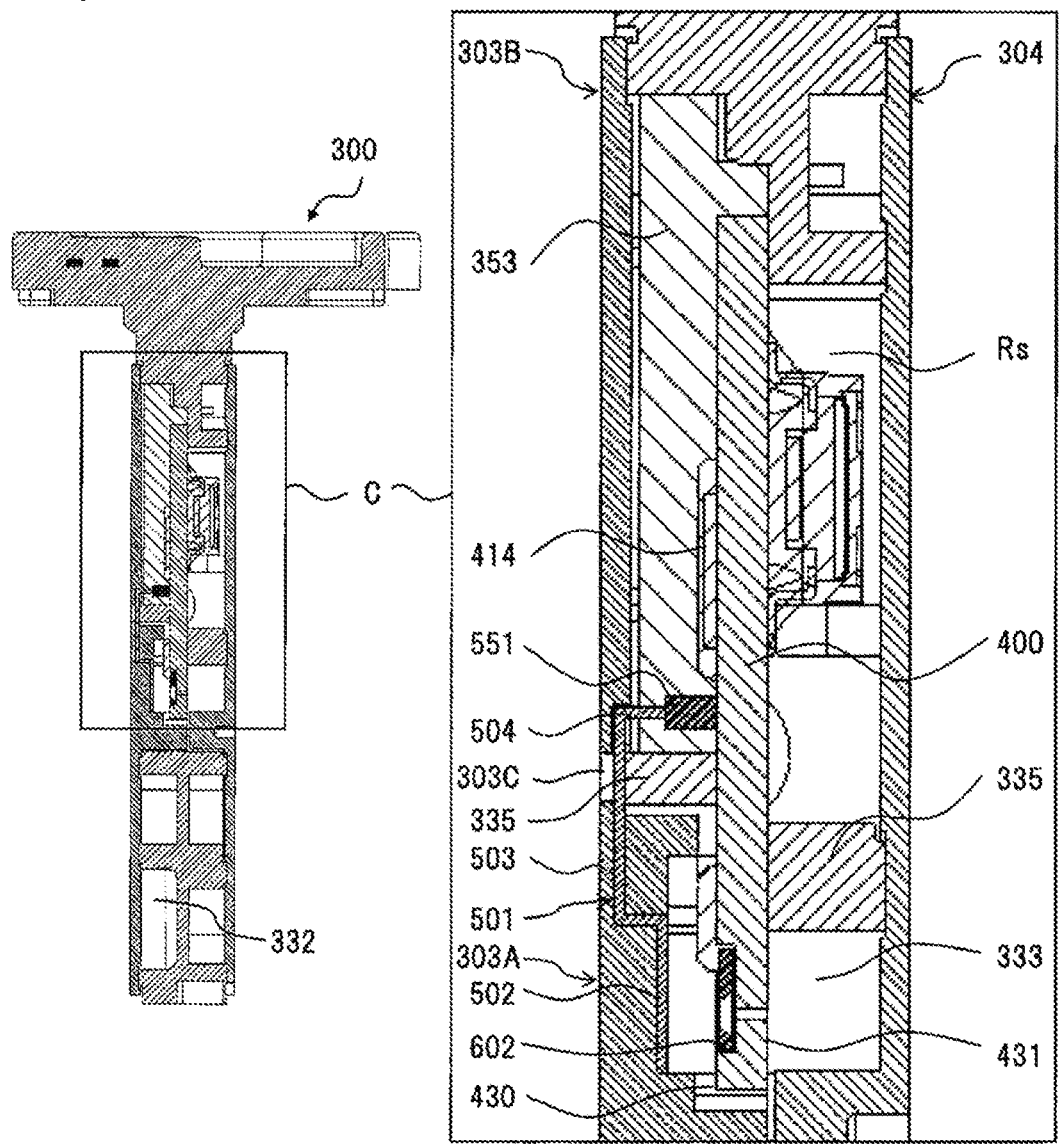
[FIG. 8B]

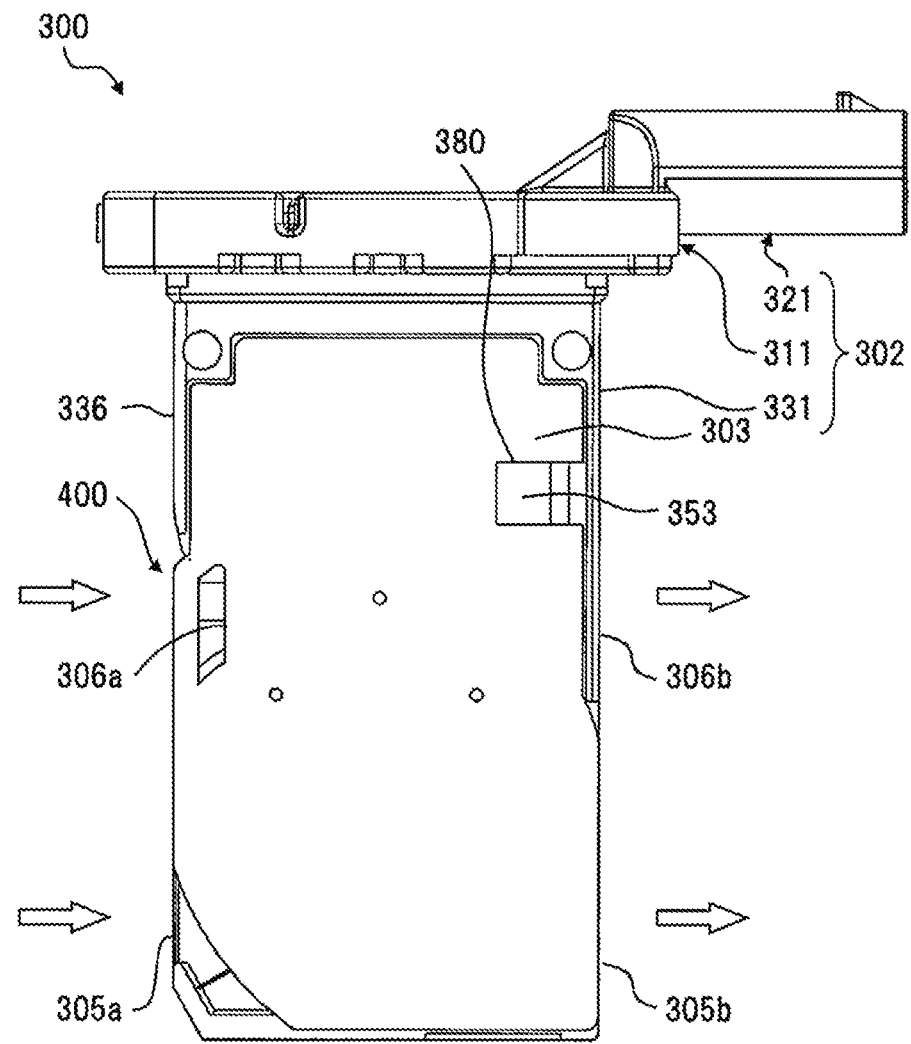

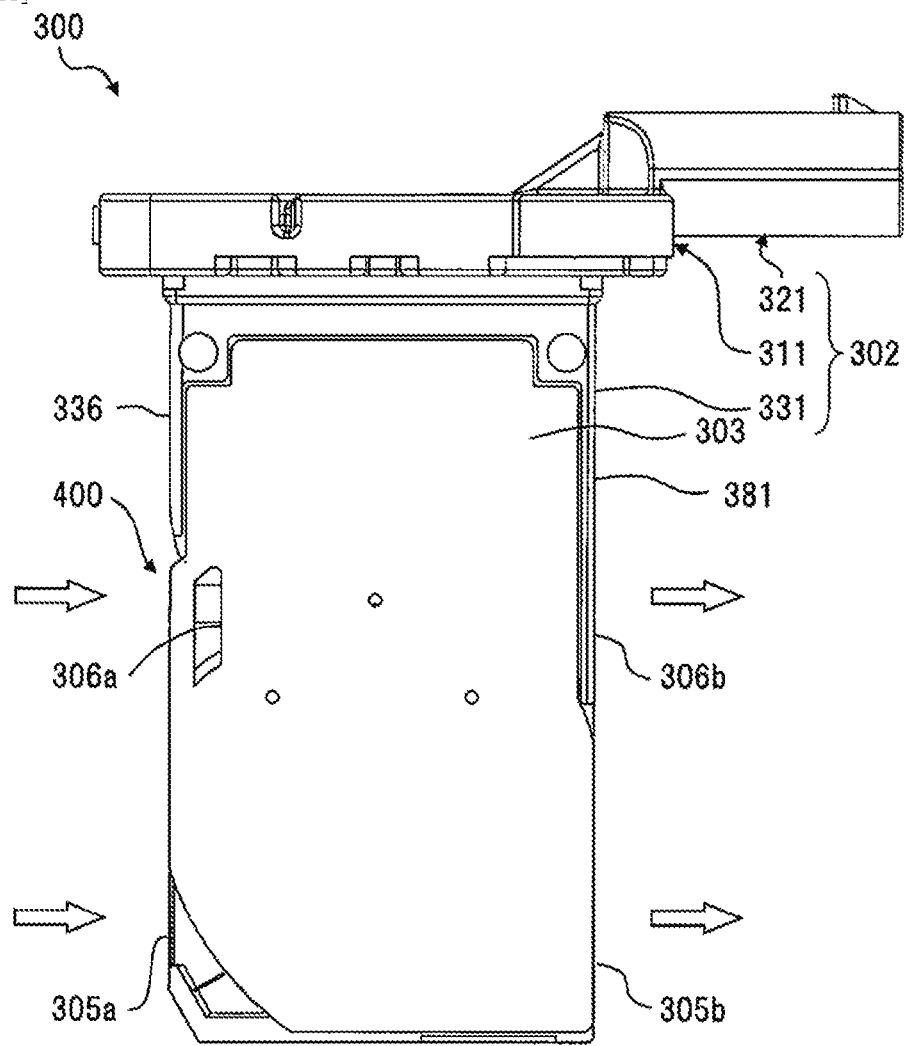
[FIG. 10A]

[FIG. 10B]
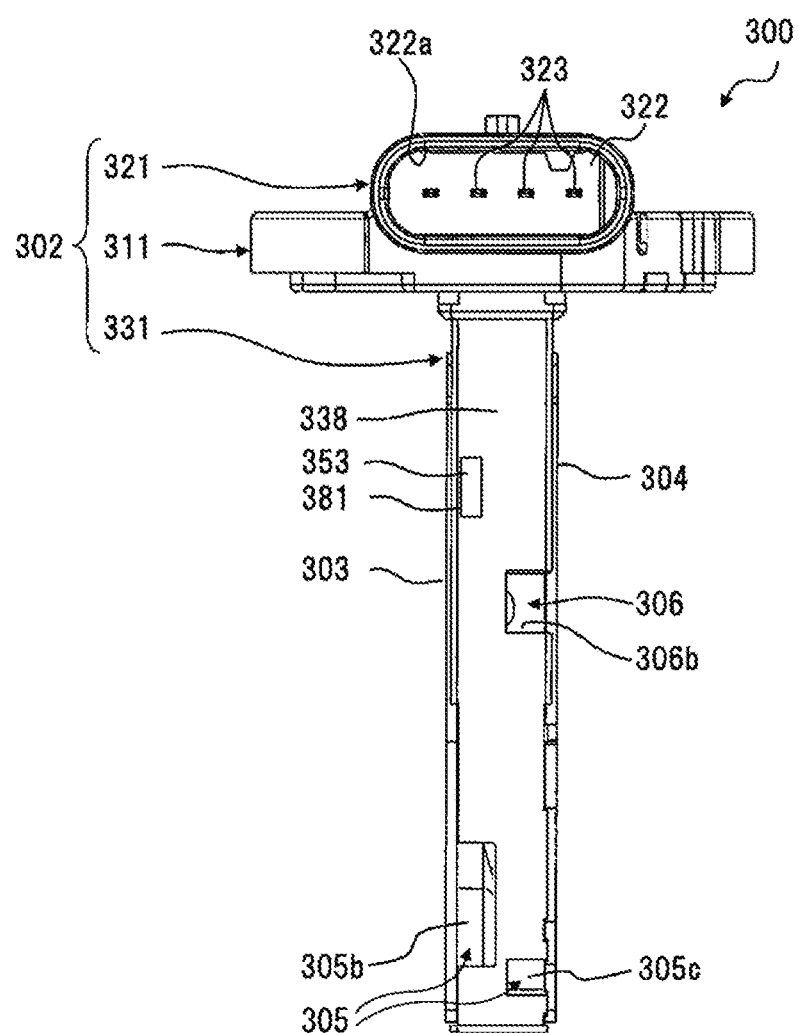

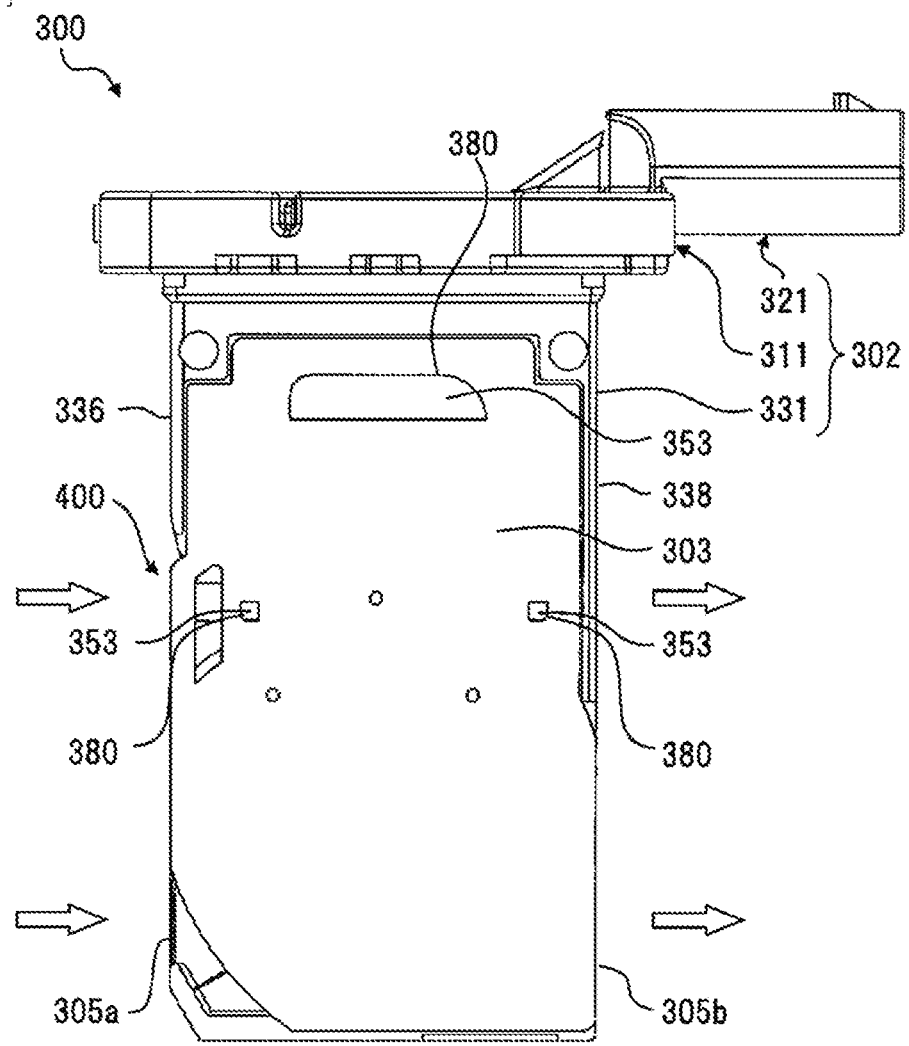
[FIG. 11]

[FIG. 12]
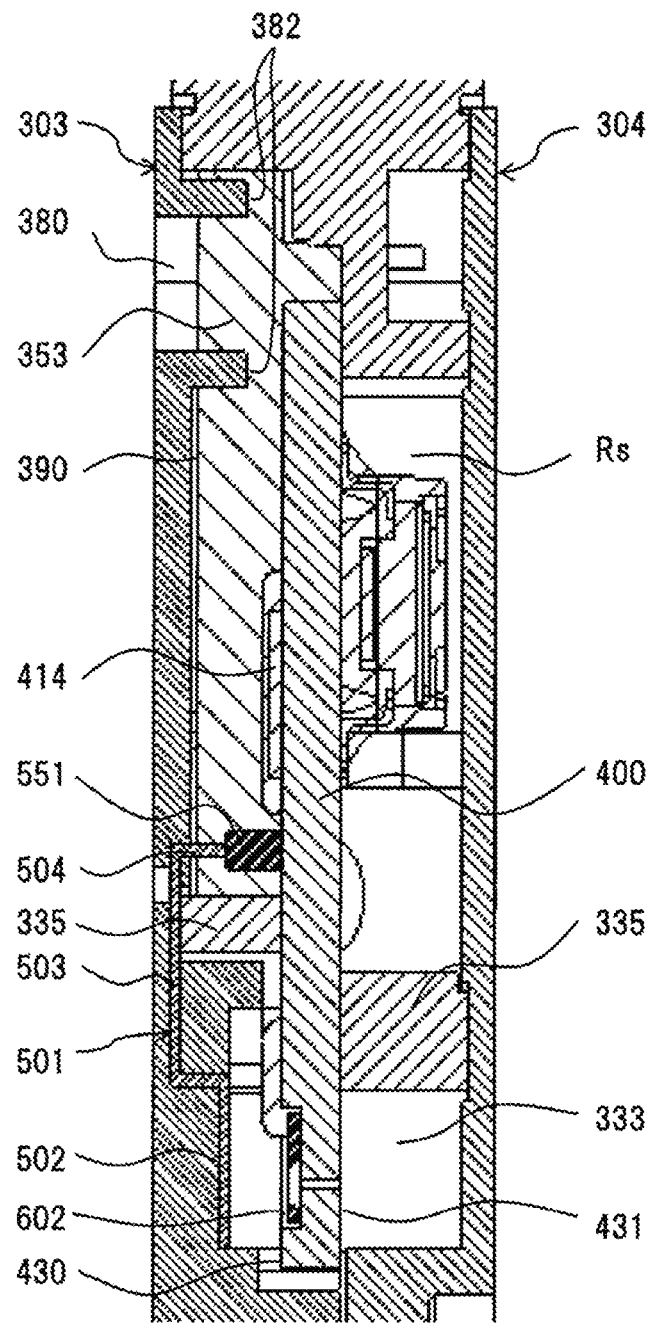

PHYSICAL QUANTITY DETECTION DEVICE

TECHNICAL FIELD

The present invention relates to a physical quantity detection device.

BACKGROUND ART

There is a physical quantity detection device as a device for measuring a physical quantity of a gas to be measured flowing through a main passage. The physical quantity detection device has a structure in which some of a gas to be measured flowing through a pipe as a main passage is taken in a sub-passage and guided to a flow rate detection unit for detecting a mass flow rate, which is one physical quantity to be measured. In the flow rate detection unit, a hot wire, a silicon element and the like are disposed, and the mass flow rate in the pipe is measured by using changes in electric resistance value by cooling the hot wire, the silicon element and the like by the air flow.

In DE102013221791 (PTL 1), a technique of a physical quantity detection device for removing the charge of contaminants by providing a static dissipative area in a bypass passage is proposed DE102013221791 (PTL 1).

CITATION LIST

Patent Literature

PTL 1: DE102013221791

SUMMARY OF INVENTION

Technical Problem

In order to prevent foreign substances from being attached to a circuit board and prevent damage due to vibration, it is required to protect soldered components or wire bondings of the circuit board with a resin sealing material. In addition, in order to achieve electric connection between a conductor and the circuit board exposed in a place where a gas to be measured passes through, it is required to achieve electric connection before protection with a resin sealing material. Further, the rigidity of the physical quantity detection device cannot be secured by only sealing with a resin and it is also required to bond a cover to a housing for constituting a bypass passage having a complicated structure. In order to meet the above requirements, in the physical quantity detection device disclosed in DE102013221791 (PTL 1), covers each required for an area which is protected by resin sealing material and an area where the gas to be measured passes through cannot be integrated, and are separated from each other. However, due to the separated covers, it is required to manufacture molds for manufacturing a plurality of covers and to invest in facilities for bonding the covers to the housing separately in two stages. Thus, there is a disadvantage that the manufacturing cost of the physical quantity detection device increases.

The present invention is made in view of the above points, and an object of the present invention is to manufacture a physical quantity detection device at low cost in a state in which electric connection with a conductor exposed in a place where a gas to be measured passes through is made.

Solution to Problem

A physical quantity detection device for solving the above problems includes: a housing; a circuit board; a resin material which covers the circuit board; a cover which forms, together with the housing, a circuit chamber in which the circuit board is disposed and a flow path through which a gas to be measured passes; and a conductor which is disposed to be exposed in the flow path, in which the conductor and the circuit board are electrically connected to each other.

Advantageous Effects of Invention

It is possible to provide a physical quantity detection device at low cost in a state in which electric connection with a conductor exposed in a place where a gas to be measured passes through is made.

BRIEF DESCRIPTION OF DRAWINGS

FIG. 1 is system diagram illustrating an embodiment in which a physical quantity detection according to the present invention is used in an internal combustion engine control system.

FIG. 2A is a front view of the physical quantity detection device according to the embodiment.

FIG. 2B is a rear view of the physical quantity detection device according to the embodiment.

FIG. 2C includes a left side view and a right side view illustrating the external appearance of the physical quantity detection device according to the embodiment.

FIG. 3A is a front view illustrating a state of a housing in which a front cover, a rear cover, and a resin sealing material are removed from the physical quantity detection device according to the embodiment.

FIG. 3B is a rear view illustrating the state of the housing in which the front cover, the rear cover, and the resin sealing material are removed from the physical quantity detection device according to the embodiment.

FIG. 3C is a cross-sectional view taken along line B-B in FIG. 3A illustrating the state of the housing in which the front cover, the rear cover, and the resin sealing material are removed from the physical quantity detection device according to the embodiment.

FIG. 4 includes a view illustrating a facing surface of the front cover and a cross-sectional view taken along line C-C.

FIG. 5 includes a view illustrating a facing surface of the rear cover and a cross-sectional view taken along line D-D.

FIG. 6 includes a cross-sectional view taken along line B-B in FIG. 3A illustrating a state of the housing in which the resin sealing material is removed from the physical quantity detection device according to the embodiment, and an enlarged view of part A in the cross-sectional view taken along line B-B.

FIG. 7 includes a cross-sectional view taken along line A-A in FIG. 2A illustrating the physical quantity detection device according to the embodiment and an enlarged view of part B in the cross-sectional view taken along line A-A.

FIG. 8A is a front view illustrating the external appearance of a physical quantity detection device of a conventional example.

FIG. 8B includes a cross-sectional view of the physical quantity detection device of the conventional example taken along line E-E in FIG. 8A and an enlarged view of part C in the cross-sectional view taken along line E-E.

FIG. 9 is a front view illustrating another example of the physical quantity detection device.

FIG. 10A is a front view illustrating still another embodiment of the physical quantity detection device.

FIG. 10B is a right side view illustrating the other embodiment of the physical quantity detection device.

FIG. 11 is a front view illustrating still further another embodiment of the physical quantity detection device.

FIG. 12 includes an enlarged view of FIG. 7 illustrating the still further another embodiment of the physical quantity detection device and a cross-sectional view illustrating the same part.

DESCRIPTION OF EMBODIMENTS

As described above, the physical quantity detection device disclosed in DE102013221791 (PTL 1) has the structure in which the covers each required for the area protected by the resin sealing material and the area where the gas to be measured passes therethrough are separated. In such a structure, in addition to the above-described problem of an increase in cost, due to the separated covers, there is a concern that the physical quantity detection device is vulnerable to engine vibration and thermal deformation and thus the rigidity of the entire physical quantity detection device may be lowered. In the following embodiments, since there is no need to separate the cover, an effect that the rigidity of the entire physical quantity detection device can be secured is also obtained.

In the following embodiments, the same symbols indicate the same configurations even in the different drawings, and draw the same operational effect. The configurations described already will be assigned only with the symbols in the drawings, and the descriptions thereof will not be repeated.

First, the configuration of a conventional physical quantity detection device will be described.

FIGS. 8A and 8B illustrate a conventional example in which a conductor and a circuit board are connected. FIG. 8A is a view illustrating the external appearance of a physical quantity detection device of a conventional example, and FIG. 8B includes a cross-sectional view taken along line E-E in FIG. 8A and an enlarged view of part C in the cross-sectional view taken along line E-E. In the conventional example illustrated in FIG. 8A, in order to attain both connection and circuit protection by casting, a front cover 303 is separated into a passage cover 303A for closing a front side sub-passages groove 332 and a circuit chamber cover 303B.

The manufacturing process of the physical quantity detection device includes first connecting a conductor 504 and a conductor 551 and connecting the passage cover 303A to a housing 302. Then, the circuit chamber is sealed with resin and finally the circuit chamber cover 303B and the housing 302 are connected. The front cover 303 takes a role of, as well as forming a passage and a circuit chamber, compensating the rigidity of the housing 302 of which strength is easily lowered due to a complicated shape. When the front cover 303 is separated as in the conventional example, the rigidity cannot be compensated and at the time of mounting the cover on a main passage 124, an increase in resonance magnification against engine vibration and an increase in deformation of the entire physical quantity detection device with respect to a change in temperature environment are generated. Thus, there is a concern of causing deterioration in measurement accuracy. In addition, there are disadvantages that in the manufacturing process of the physical quantity detection device, a cost for fabricating two molds for manufacturing the passage cover 303A and the circuit chamber cover 303B is required, and cost and time are required for performing a welding process of the front cover 303 and the housing 302 twice for the passage cover 303A and the circuit cover 303B.

Embodiment 1

«1. Regarding Physical Quantity Detection Device in Internal Combustion Engine»

FIG. 1 is system diagram illustrating an embodiment in which a physical quantity detection device according to the present invention is used in an internal combustion engine control system of an electronic fuel injection type. Based on the operation of an internal combustion engine 110 including an engine cylinder 112 and an engine piston 114, intake air is suctioned as a gas to be measured 30 from an air cleaner 122, and is then guided to a combustion chamber of the engine cylinder 112 through a main passage 124, for example, an intake body, a throttle body 126, and an intake manifold 128. A physical quantity of the gas to be measured 30, which is intake air that is guided to the combustion chamber, is detected by a physical quantity detection device 300, and fuel is supplied from a fuel injection valve 152 based on the detected physical quantity, and is guided to the combustion chamber in a mixed air state in combination with the gas to be measured 30. In the embodiment, the fuel injection valve 152 is provided in an intake port of the internal combustion engine, and the fuel that is injected to the intake port forms a mixed gas in combination with the gas to be measured 30 that is intake air, and is guided to the combustion chamber through an intake valve 116. The mixed gas is combusted to generate mechanical energy.

The fuel and the air, which are guided to the combustion chamber, enter a state in which the fuel and the air are mixed with each other. The fuel and the air are explosively combusted by spark ignition of an ignition plug 154 to generate mechanical energy. The gas after being combusted is guided from an exhaust valve 118 to an exhaust pipe, and is discharged from the exhaust pipe to the outside of a vehicle as an exhaust gas 24. The flow rate of the gas to be measured 30, which is intake air that is guided to the combustion chamber, is controlled by a throttle valve 132 of which an opening degree varies based on an operation of an accelerator pedal. The fuel supply amount is controlled based on the flow rate of the intake air that is guided to the combustion chamber, and a driver controls the opening degree of the throttle valve 132 to control the flow rate of the intake air that is guided to the combustion chamber. According to this, the driver can control mechanical energy that is generated by the internal combustion engine.

A physical quantity such as the flow rate, temperature, humidity, and pressure of the gas to be measured 30, which is intake air that is taken-in from the air cleaner 122 and flows through the main passage 124, is detected by the physical quantity detection device 300, and an electric signal indicating the physical quantity of the intake air is input to a control device 200 from the physical quantity detection device 300. In addition, an output of a throttle angle sensor 144, which measures the opening degree of the throttle valve 132, is input to the control device 200. In addition, the positions and states of the engine piston 114, the intake valve 116, and the exhaust valve 118 of the internal combustion engine, and an output of a rotation angle sensor 146 for measurement of a rotational speed of the internal combustion engine are input to the control device 200. An output of an oxygen sensor 148 is input to the control device 200 so as to measure a state of a mixed ratio between the amount of fuel and the amount of air from the state of the exhaust gas 24.

The control device 200 calculates a fuel injection amount and ignition time based on the physical quantity of the intake air, which is an output of the physical quantity detection device 300, and a rotational speed of the internal combustion engine which is measured based on the output of the rotation angle sensor 146. The amount of fuel supplied from the fuel injection valve 152, and the ignition time by the ignition plug 154 are controlled based on the calculation result. Actually, the fuel supply amount or the ignition time is very finely controlled based on a temperature detected by the physical quantity detection device 300, a variation state of a throttle angle, a variation state of an engine rotational speed, and a state of air-fuel ratio measured by the oxygen sensor 148. Further, the control device 200 controls the amount of air that bypasses the throttle valve 132 in an idle driving state of the internal combustion engine by using an idle air control valve 156 to control the rotational speed of the internal combustion engine in the idle driving state.

«2. Regarding Structure of Physical Quantity Detection Device»

FIGS. 2A to 2C are views showing the external appearance of the physical quantity detection device 300, FIG. 2A is a front view of the physical quantity detection device 300, FIG. 2B is a rear view, and FIG. 2C includes a left side view and a right side view.

The physical quantity detection device 300 includes the housing 302, the front cover 303, and the rear cover 304. The housing 302 is configured by molding a synthetic resin material, and includes a flange 311 that fixes the physical quantity detection device 300 to the intake body that is the main passage 124, an external connection section 321 that protrudes from the flange 311 and includes a connector for establishment of electric connection with an external device, and a measurement section 331 that extends to protrude toward the center of the main passage 124 from the flange 311.

A circuit substrate 400 is integrally provided in the measurement section 331 through insert-molding during molding of the housing 302 (refer to FIGS. 3A and 3B). In the circuit board 400, at least one detection unit that detects the physical quantity of the gas to be measured 30 that flows through the main passage 124, and a circuit unit that processes a signal that is detected by the detection unit are provided. The detection unit is disposed at a position that is exposed to the gas to be measured 30, and the circuit unit is disposed in a circuit chamber RC that is formed by the front cover 303 and is covered by a resin sealing material 353. In addition, the resin sealing material 353 is exposed from a cover opening 380.

«3. Regarding Sub-Passage Structure»

A sub-passage groove is provided in a front surface and a rear surface of the measurement section 331, and a first sub-passage 305 is formed in cooperation of the front cover 303 and the rear cover 304. A first sub-passage inlet 305a that takes some of the gas to be measured 30 such as intake air into the first sub-passage 305, and a first sub-passage outlet 305b that allows the gas to be measured 30 to return to the main passage 124 from the first sub-passage 305 are provided at a tip end of the measurement section 331. A part of the circuit substrate 400 protrudes in the middle of the passage of the first sub-passage 305, and a flow rate detection unit 602 (refer to FIG. 3A), which is a detection unit, is disposed at t the protruding portion to detect the flow rate of the gas to be measured 30.

A second sub-passage 306 for taking some of the gas to be measured 30 such as intake air into a sensor chamber Rs, is provided at an intermediate portion of the measurement section 331 that is closer to the flange 311 in relation to the first sub-passage 305. The second sub-passage 306 is formed by cooperation of the measurement section 331 and the rear cover 304. The second sub-passage 306 includes a second sub-passage inlet 306a that is opened to an upstream side outer wall 336 to take in the gas to be measured 30, and a second sub-passage outlet 306b that is opened to a downstream side outer wall 338 so as to allow the gas to be measured 30 to return from the second sub-passage 306 to the main passage 124. The second sub-passage 306 communicates with the sensor chamber Rs that is formed on a rear surface side of the measurement section 331. A pressure sensor and a humidity sensor, which are provided on a rear surface of the circuit substrate 400 as a detection unit, are disposed in the sensor chamber Rs.

«4. Regarding External Connection Method»

The external connection section 321 includes a connector 322 that is provided on an upper surface of the flange 311, and protrudes from the flange 311 toward a downstream side in a flow direction of the gas to be measured 30. An insertion hole 322a, into which a communication cable for connection with the control device 200 is inserted, is provided in the connector 322. As illustrated in the right side view of FIG. 2C, four external terminals 323 are provided on the inside of the insertion hole 322a. The external terminals 323 serve as a terminal for outputting information of a physical quantity that is the measurement result of the physical quantity detection device 300, and a power supply terminal for supplying DC power for operation of the physical quantity detection device 300.

«S. Regarding Structure of Housing»

Next, an overall structure of the housing 302 will be described with reference to FIGS. 3A to 3C. FIGS. 3A to 3C are views illustrating a state of the housing 302 in which the front cover 303 and the rear cover 304 are removed from the physical quantity detection device 300, FIG. 3A is a front view of the housing 302, FIG. 3B is a rear view of the housing 302, and FIG. 3C is a cross-sectional view taken along line B-B in FIG. 3A.

The housing 302 has a structure in which the measurement section 331 extends from the flange 311 toward the center of the main passage 124. The circuit substrate 400 is insert-molded on a base end side of the measurement section 331. The circuit board 400 is disposed in parallel along a surface of the measurement section 331 at an intermediate position between a front surface and a rear surface of the measurement section 331 and is integrally molded in the housing 302, and the base end side of the measurement section 331 is partitioned into one side and the other side in a thickness direction.

«6. Regarding Structure of Vicinity of Circuit Board»

A circuit chamber Rc in which a circuit unit of the circuit substrate 400 is accommodated is formed on a surface side of the measurement section 331, and a sensor chamber Rs in which a pressure sensor and a humidity sensor are accommodated is formed on a rear side of the measurement section 331. The circuit chamber Rc is formed by attaching the front cover 303 to the housing 302, communicates with the outside of the measurement section 331 through the cover opening 380 before the resin sealing material 353 is filled. The sensor chamber Rs is formed as an inner space that communicates with the second sub-passage 306 and the outside of the measurement section 331 through the second sub-passage 306 by attaching the rear cover 304 to the housing 302. A part of the circuit substrate 400 protrudes into the first sub-passage 305 from a partition wall 335 that partitions the circuit chamber Rc of the measurement section 331 and the first sub-passage 305 from each other. A flow rate detection unit 602 is provided on a measurement flow path surface 430 of the protruding portion.

«7. Regarding Structure of First Sub-Passage»

A sub-passage groove for forming the first sub-passage 305 is provided on a tip end side of the measurement section 331 in the longitudinal direction. The sub-passage groove for forming the first sub-passage 305 includes a front side sub-passage groove 332 illustrated in FIG. 3A, and a rear side sub-passage groove 334 illustrated in FIG. 3B. As illustrated in FIG. 3C, the front side sub-passage groove 332 is curved toward the flange 311 side that is a base end side of the measurement section 331 as it transitions toward the upstream side outer wall 336 from the first sub-passage outlet 305b that is opened to the downstream side outer wall 338 of the measurement section 331. The front side sub-passage groove 332 communicates with an opening 333 that passes through the measurement section 331 in a thickness direction thereof at a position in the vicinity of the upstream side outer wall 336. The opening 333 is formed along a flow direction of the gas to be measured 30 of the main passage 124 so as to extend between the upstream side outer wall 336 and the downstream side outer wall 338.

As illustrated in FIG. 3B, the rear side sub-passage groove 334 transitions from the upstream side outer wall 336 toward the downstream side outer wall 338 and is divided into two parts at an intermediate position between the upstream side outer wall 336 and the downstream side outer wall 338. One of the two divided parts linearly extends as is as a discharge passage and is opened to a discharge port 305c of the downstream side outer wall 338. The other part is curved toward the flange 311 side that is the base end side of the measurement section 331 as it transitions to the downstream side outer wall 338 and communicates with the opening 333 at a position in the vicinity of the downstream side outer wall 338.

The rear side sub-passage groove 334 forms an inlet groove into which the gas to be measured 30 flows from the main passage 124, and the front side sub-passage groove 332 forms an outlet groove that allows the gas to be measured 30, which is taken-in from the rear side sub-passage groove 334, to return to the main passage 124.

As illustrated as FIG. 3B, some of the gas to be measured 30, which flows through the main passage 124, is taken into the rear side sub-passage groove 334 from the first sub-passage inlet 305a, and flows through the inside of the rear side sub-passage groove 334. In addition, a foreign substance with a large mass included in the gas to be measured 30 flows into a discharge passage that linearly extends as is from a divergence in combination with some of the gas to be measured, and is discharged from the discharge port 305c of the downstream side outer wall 338 to the main passage 124.

The rear side sub-passage groove 334 has a shape in which the depth increases as it transitions, and the gas to be measured 30 gradually moves to a front surface side of the measurement section 331 as the gas to be measured 30 flows along the rear side sub-passage groove 334. Particularly, a steeply inclined portion 334a in which the depth steeply increases in front of the opening 333 is provided in the rear side sub-passage groove 334, and thus some of air with a small mass moves along the steeply inclined portion 334a and flows through the measurement flow path surface 430 side of the circuit substrate 400 in the inside of the opening 333. On the other hand, it is difficult for the foreign substance with a large mass to steeply change a route, and thus this foreign substance flows through a measurement flow-path-surface rear surface 431 side.

As illustrated as FIG. 3A, the gas to be measured 30, which moves to a front side in the opening 333, flows along the measurement flow path surface 430 of the circuit substrate, and is subjected to heat transfer with the flow rate detection unit 602 that is provided on the measurement flow path surface 430. According to this, the flow rate is measured. The air flowing into the front side sub-passage groove 332 from the opening 333 flows along the front side sub-passage groove 332, and is discharged to the main passage 124 from the first sub-passage outlet 305b that is opened to the downstream side outer wall 338.

A substance with a large mass, such as dust, which is mixed in the gas to be measured 30, has a great inertial force, and thus it is difficult for the substance to steeply change a route to a groove depth direction along a surface of a part of the steeply inclined portion 334a of which a groove depth steeply increases. Accordingly, the foreign substrate with a large mass moves to the measurement flow-path-surface rear surface 431 side, and thus it is possible to prevent the foreign substance from passing through the vicinity of the flow rate detection unit 602. This embodiment has a configuration in which the majority of the foreign substance with a large mass other than a gas is allowed to pass through the measurement flow-path-surface rear surface 431 that is a rear surface of the measurement flow path surface 430, and thus it is possible to reduce an effect of a contaminant due to a foreign substance such as an oily component, carbon, and dust. Thus, it is possible to prevent deterioration of measurement accuracy. That is, due to a shape in which a route of the gas to be measured 30 is steeply changed along an axis that intersects a flow axis of the main passage 124, it is possible to reduce the effect of a foreign substance that is mixed in the gas to be measured 30.

«8. Regarding Resin Sealing Material»

The resin sealing material 353 is so as to cover all electronic components such as an LSI 414 and all the electric junction portions of aluminum wires 413 in the circuit chamber Rc, and thus prevents electrolytic corrosion from occurring due to adherence of corrosive gas, salt water, oil, or the like. In addition, the aluminum wire 413 for transmitting a signal to the outside of the circuit board 400 is fixed by being covered by the resin sealing material 353 and thus it is possible to prevent disconnection due to vibration or the like. Further, a hollow portion between the circuit board 400 and the front cover 303 is filled with the resin sealing material 353 and thus the mechanical strength of the circuit chamber portion in the entire structure of the housing 302 is improved.

It is preferable that the resin sealing material 353 has insulation properties and a thermosetting resin such as epoxy resin or polyurethane resin, and a thermoplastic resin such as polyimide or acrylic resin can be used. Resins formed by incorporating an insulating filler such as glass in such resins can also be used.

«9. Regarding Structure of Front Cover and Rear Cover»

FIG. 4 includes a view illustrating a facing surface of the sub-passage of the front cover 303 and a cross-sectional view taken along line C-C. FIG. 5 includes a view illustrating a facing surface of the sub-passage of the rear cover 304 and a cross-sectional view taken along line D-D.

In FIGS. 4 and 5, the front cover 303 and the rear cover 304 respectively close the front side sub-passage groove 332 and the rear side sub-passage groove 334 of the housing 302 to form the first sub-passage 305. In addition, the front cover 303 forms the circuit chamber Rc and the rear cover 304 closes a rear surface side concave portion of the measurement section 331 to form the second sub-passage 306 and the sensor chamber Rs that communicates with the second sub-passage 306.

The front cover 303 and the rear cover 304 are respectively attached to the front surface and the rear surface of the measurement section 331. In addition, the front cover 303 and the rear cover 304 are bonded to edges of the front side sub-passage groove 332 and the rear side sub-passage groove 334 by laser welding and the like. Similarly, the front cover 303 and the rear cover 304 are bonded to edges of the circuit chamber Rc and the sensor chamber Rs by laser welding and the like.

A fifth area 361 which closes the front side sub-passage groove 332 of the housing 302, a sixth area 362 which closes the front side sub-passage groove 332 of the housing 302, and a seventh area 363 which forms the circuit chamber Rc are formed on the facing surface of the front cover 303. In addition, the cover opening 380 is provided in the seventh area 363.

A conductor 501 is provided in the front cover 303. The conductor 501 is provided to eliminate static electricity so as to prevent a foreign substance such as dust included in the gas to be measured from being charged and attached to the flow rate detection unit 602 and the vicinity thereof. For example, the conductor is formed by using a metal plate of aluminum alloy or the like having conductivity. In the embodiment, the conductor 501 is insert-molded in the front cover 303 to be integrally formed with the front cover 303. The conductor 501 can be formed by using a resin material containing a conductive filler such as carbon or alumina, in addition to the metal plate having conductivity.

The conductor 501 includes a flat plate portion 502 which is disposed in the sixth region 362 of the front cover 303 and an arm portion 503 which protrudes from the flat plate portion 502 and has a tip disposed in the seventh region 363. At least a part of the flat plate portion 502 is exposed to the facing surface of the front cover 303 and is disposed to face a position facing at least the flow rate detection unit 602 of the measurement flow path surface 430 of the circuit board 400 in the opening 333 which is a measurement flow path of the housing 302. The flat plate portion 502 has a convex shape in which the center in the flow direction of the gas to be measured 30 protrudes in a mountain shape to speed up the flow rate of the gas to be measured 30 passing between the flat plate portion and the flow rate detection unit 602. The arm portion 503 includes a claw portion 504 bent at the tip end. The claw portion 504 abuts on a tip end of an intermediate member 551 disposed in the circuit chamber Rc of the circuit board 400 in a state in which the front cover 303 is attached to the housing 302. The intermediate member 551 is connected to a ground circuit in the circuit board.

A first rea 371A which closes the rear side sub-passage groove 334 of the housing 302, a second area 371B which closes the steeply inclined portion 334a, a third area 372 which closes the opening 333 of the housing 302, and a fourth area 373 which forms the senor chamber Rs are formed on the facing surface of the rear cover 304.

«10. Description of Formation of Neutralization Circuit and Circuit Protection Method and Effect Thereof»

FIGS. 6 and 7 are view illustrating electric connection between the conductor and the circuit board and a resin sealing method of the circuit chamber. FIG. 6 includes a cross-sectional view taken along B-B in FIG. 3A immediately after cover bonding before resin sealing and an enlarged view of part A. FIG. 7 includes a cross-sectional view taken along A-A in FIG. 2A after resin sealing and an enlarged view of part B.

As illustrated in FIG. 6, the conductor 501 provided in the rear cover 303 is conductively connected to the circuit board 400 through the intermediate member 551 by attaching the front cover 303 to the housing 302. Accordingly, a conductive circuit in which the conductor 501 is connected to the ground can be configured and the flow rate detection unit 602 in the measurement flow path in which the conductor 501 is disposed and which is a place where the gas to be measured 30 passes therethrough, and it is possible to remove the static electricity from the neighboring components. Accordingly, foreign substances such as fine particles included in the gas to be measured 30 are prevented from being charged and firmly attached to the flow rate detection unit 602 or the like and thus it is possible to prevent deterioration in detection performance due to contamination.

After the connection between the conductor 501 and the circuit board 400 is made through the intermediate member 551, as illustrated in the enlarged view in FIG. 7, the resin sealing material 353 is injected from the cover opening 380 so that circuit components on the circuit board 400 can be protected.

A material for the intermediate member 551 may be any material as long as the material takes a role of achieving electric connection between the conductor 501 and the circuit board 400. For example, a resin material containing a conductive filler such as carbon or alumina, and a metal material such as solder or silver can be used. In addition, as the form thereof, as well as an adhesive curable by heat or chemical reaction, a rubber material which is cured in advance and protects connection by elastic deformation due to reduction at the time of connection can be used. In addition, a combination of adhesive and rubber may be used.

«11. Regarding Position of Cover Opening»

The cover opening 380 is disposed in the vicinity of the flange 311 of the front cover 303. This means that as illustrated in the enlarged view in FIG. 6, a projection portion from the aluminum wire 413 having the highest height from the main surface of the circuit board 400 to the rear cover 303 is overlapped with the cover opening 380. In other words, the cover opening 380 is provided so as to be overlapped with a projection portion of a component or wire closest to the surface in which the cover opening 380 is provided, among components or wires to be mounted on the circuit board 400, to the surface in which the cover opening 380 is provided.

In the physical quantity detection device in the embodiment, the resin sealing material 353 is infected in a state in which the cover opening 380 is directed upward, and thus the resin sealing material 353 is changed from the right side in the enlarged view in FIG. 6. At this time, when the cover opening 380 is at a position other than the position shown in FIG. 6, it is difficult to determine whether or not the aluminum wire 413 is completely sealed with the resin. As described in the embodiment, by adjusting the position of the cover opening 380 to the projection portion of the highest component or wire from the circuit board 400, it is possible to confirm whether or not the component or the circuit is sealed with resin and more reliably protect the circuit board 400.

Embodiment 2

FIG. 9 is a schematic view illustrating another configuration example of a casting opening for casting the resin sealing material 353 to the circuit chamber Rc provided in the circuit chamber Rc. In FIG. 9, the cover opening 380 is formed in cooperation of the housing 302. The cover opening 380 described in Embodiment 1 is closed in the front cover 303, but the shape of the cover opening 380 is not limited thereto. As illustrated in FIG. 9, the cover opening 380 may be opened in the front cover 303. The closed shape is a state in which the cover opening 380 includes a hole as illustrated in FIG. 4. In addition, the open shape is a state in which the edge of the cover opening 380 includes a concave portion as illustrated in FIG. 9 and the housing 302 and a part of the front cover 303 are not bonded to each other. In other words, the open shape is a state in which an opening is provided in the bonded portion of the housing 302 and the front cover 303.

Embodiment 3

FIGS. 10A and 10B are views in which a housing opening 381 is provided in the housing 302, FIG. 10A is a front view of Embodiment 3, and FIG. 10B is a right side view in Embodiment 3. As illustrated in FIG. 10B, in the embodiment, the housing opening 381 is provided in the housing 302 instead of the front cover 303. The housing opening 381 may have an open shape or closed shape in the housing 302. In addition, in combination with Embodiment 2, the opening 380 of an open shape is provided in the front cover 303, and the opening 381 of an open shape is provided in the housing 302. The opening 380 and the opening 381 may form one opening when the front cover 303 and the housing 302 are bonded to each other. In other words, the open shape is a state in which an opening is provided in the bonded portion of the housing 302 and the front cover 303, and the open shape described in Embodiment 2 is a state in which an opening is provided close to the front cover 303 in the bonded portion. The open shape described in Embodiment 3 is a state in which an opening is provided close to the housing 302 or an opening is provided between the front cover 303 and the housing 302. In the embodiment, when the resin sealing material 353 is cast, casting is performed in a state in which the housing opening 381 is directed upward. At this time, it is preferable to case the resin sealing material 353 to the height to cover at least all the circuit component.

Embodiment 4

FIG. 11 illustrates an embodiment in which a plurality of cover openings 380 are provided. In the embodiment, by providing the plurality of cover openings 380, the air in the circuit chamber Rc is escaped before casting. Due to the structure, air entrainment and the like can be prevented at the time of casting and the reliability of the component in the circuit chamber Rc can be improved. The cover opening 380 provided in the bonded portion of the housing 302 and the front cover 303 described in Embodiment 2, or a plurality of housing openings 381 described in Embodiment 3 may be provided.

Embodiment 5

FIG. 12 includes an enlarged view of FIG. 7 and a schematic view of still another configuration example of the cover opening shape at the same part.

In FIG. 12, an opening protrusion 382 is formed along the edge of the circuit chamber Rc side of the cover opening 380, and the opening protrusion 382 comes into contact with the resin sealing material 353. In a case where the opening protrusion 382 is not provided, as illustrated in the enlarged view of FIG. 7, a gap portion 390 between the resin sealing material 353 and the front cover 303 communicates with the outside and thus there is a concern of contaminants, such as water or oil, being retained in the inside. As in the embodiment, the opening protrusion 382 is provided and is brought into contact with and embedded in the resin sealing material 353. Thus, the gap portion 390 can be tightly sealed and resin deterioration due to retention of water or oil can be prevented.

In the above embodiments, the opening shape of the cover and the housing was described. The opening can be closed by another member after casting. By closing the opening by another member, the reliability of the circuit chamber Rc can be further improved.

In the above embodiments, the circuit board 400 is molded integrally with the housing 302, but after the housing 302 is formed by molding, the circuit board 400 can be applied to be bonded with the housing with an adhesive or the like. The rigidity of the entire device is further lowered in a case where the circuit board 400 is bonded with the housing with an adhesive or the like than a case where the circuit board 400 is integrally formed with the housing, and thus the effect is more easily exhibited.

Hereinbefore, the embodiments of the present invention were described in detail, but the present invention is not limited to the embodiments, and various design changes can be made in a range not departing from the spirit of the invention described in claims. For example, the embodiments were described in detail to easily understand the present invention, and are not necessarily required to include all the described configurations. In addition, part of the configuration of one of the embodiments can be replaced with the configurations of the other embodiments, and the configuration of one of the embodiments can be added with the configurations of the other embodiments. Further, part of the configuration of each embodiment can be added with, deleted from, and replaced with the other configurations.

The disclosure content of the following priority application is incorporated herein as a quotation Japanese Patent Application No. 2016-078570 (filed on Apr. 11, 2016)

REFERENCE SIGNS LIST

20: intake air, 24: exhaust gas, 30: gas to be measured, 110: internal combustion engine, 112: engine cylinder, 114: engine piston, 116: intake valve, 118: exhaust valve, 122: air cleaner, 124: main passage, 126: throttle body, 128: intake manifold, 132: throttle valve, 144: throttle angle sensor, 146: rotation angle sensor, 148: oxygen sensor, 152: fuel injection valve, 154: ignition plug, 156: idle air control valve, 200: control device, 300: physical quantity detection device, 302: housing, 303: front cover, 303A: passage cover, 303B: circuit chamber cover, 303C: separation portion, 304: rear cover, 305: first sub-passage, 305a: first sub-passage inlet, 305b: first sub-passage outlet, 305c: discharge port, 306: second sub-passage, 306a: second sub-passage inlet, 306b: second sub-passage outlet, 311: flange, 321: external connection section, 322: connector, 322a: insertion hole, 323: external terminal, 331: measurement section, 332: front side sub-passages groove, 333: opening, 334: rear side sub-passage groove, 334a: steeply inclined portion, 335: partition wall, 336: upstream side outer wall, 338: downstream side outer wall, 353: resin sealing material, 361: fifth area, 362: sixth area, 363: seventh area, 371A: first area, 371B: second area, 372: third area, 373: fourth area, 380: cover opening, 381: housing opening, 382: opening protrusion, 390: circuit chamber gap, 400: circuit board, 413: aluminum wire, 414: LSI, 430: measurement flow path surface, 431: measurement flow-path-surface rear surface, 501: conductor, 502: flat plate portion, 503: arm portion, 504: claw portion, 551: intermediate member, 602: flow rate detection unit, Rs: sensor chamber, Rc: circuit chamber

The invention claimed is:

1. A physical quantity detection device comprising:
 a housing;
 a circuit board;
 a resin material which covers the circuit board;
 a cover which forms, together with the housing, a circuit chamber in which the circuit board is disposed and a flow path through which a gas to be measured passes;
 a conductor which is disposed to be exposed in the flow path;
 a conductive intermediate member is interposed between the conductor and the circuit board, wherein
 the conductive intermediate member conductively connects the conductor and the circuit board by attaching to a front cover of the housing.

2. The physical quantity detection device according to claim 1, wherein
 an opening is provided in the circuit chamber.

3. The physical quantity detection device according to claim 2, wherein
 the opening is formed in the housing or the cover, or a bonded portion of the housing and the cover in the circuit chamber.

4. The physical quantity detection device according to claim 2, wherein
 the opening is formed in the cover, and a convex shape is given in a side edge portion of the opening close to the circuit chamber.

5. The physical quantity detection device according to claim 2, wherein
 a plurality of the openings are provided in the circuit chamber.

6. The physical quantity detection device according to claim 2, wherein
 the opening is formed in the cover, and a projection portion from a component or wire having a highest height from the circuit board to the cover among components or wires to be mounted on the circuit board is overlapped with the opening.

7. The physical quantity detection device according to claim 2, wherein
 the opening is provided so as to be overlapped with a projection portion of a component or wire, among components or wires to be mounted on the circuit board, close to a surface in which the opening is provided to the surface in which the opening is provided.

8. The physical quantity detection device according to claim 1, wherein
 the conductive intermediate member is a resin.

9. The physical quantity detection device according to claim 1, wherein
 the conductor is formed integrally with the cover.

10. The physical quantity detection device according to claim 1, wherein
 the circuit chamber includes a rear side sub-passage, the rear side sub-passage has a inclined portion through which the gas to be measured passes, and
 particles in the gas to be measured flow from the inclined portion to a measurement flow-path rear surface, the measurement flow-path rear surface prevents the particles from entering a flow rate detector.

* * * * *